(12) United States Patent
Lindsay et al.

(10) Patent No.: US 9,256,805 B2
(45) Date of Patent: Feb. 9, 2016

(54) METHOD AND SYSTEM OF IDENTIFYING AN ENTITY FROM A DIGITAL IMAGE OF A PHYSICAL TEXT

(71) Applicants: Robert Taaffe Lindsay, San Francisco, CA (US); Alexander Van Cleef Lindsay, London (GB)

(72) Inventors: Robert Taaffe Lindsay, San Francisco, CA (US); Alexander Van Cleef Lindsay, London (GB)

( * ) Notice: Subject to any disclaimer, the term of this patent is extended or adjusted under 35 U.S.C. 154(b) by 0 days.

(21) Appl. No.: 14/591,175

(22) Filed: Jan. 7, 2015

(65) Prior Publication Data
US 2015/0206031 A1  Jul. 23, 2015

Related U.S. Application Data

(63) Continuation-in-part of application No. 14/517,920, filed on Oct. 20, 2014.

(60) Provisional application No. 61/923,174, filed on Jan. 2, 2014.

(51) Int. Cl.
| | | |
|---|---|---|
| *G06K 9/72* | (2006.01) | |
| *G06K 9/62* | (2006.01) | |
| *G06F 17/30* | (2006.01) | |
| *G06F 17/27* | (2006.01) | |
| *G06K 9/18* | (2006.01) | |

(52) U.S. Cl.
CPC .......... *G06K 9/6215* (2013.01); *G06F 17/2735* (2013.01); *G06F 17/2765* (2013.01); *G06F 17/30253* (2013.01); *G06F 17/30268* (2013.01); *G06F 17/30705* (2013.01); *G06K 9/18* (2013.01); *G06K 9/6218* (2013.01); *G06K 9/72* (2013.01)

(58) Field of Classification Search
CPC ..................... G06F 17/30864; G06F 17/30696
See application file for complete search history.

(56) References Cited

U.S. PATENT DOCUMENTS

2012/0324350 A1* 12/2012 Rosenblum et al. .......... 715/256
2014/0125599 A1*  5/2014 Seeley ........................... 345/173

OTHER PUBLICATIONS (Noe' Martinez, "Wine Cellar: An OCR Based Wine Recommendation Application for the Android Mobile OS", 2009, http://www.alchemyapi.com/tools/alchemysnap/).*

* cited by examiner

Primary Examiner — Siamak Harandi (57) ABSTRACT

A method of identifying an entity from text in a digital image includes the step of obtaining a digital image. The digital image includes a digital photograph of a physical text. At least a portion of the physical text is related to a pre-defined topic. The digital photograph of the physical text is converted to a text in a computer-readable format. A word dictionary is provided. The word dictionary includes a set of words related to the pre-defined topic. A set of words of matching the text to similar words in the set of words in the word dictionary. A word cluster in the text is identified. Each word in the word cluster is associated with a category of a single entity. The single entity is a member of a class of entities demarcated by the pre-defined topic. A database including a list of members of the class of entities demarcated by the pre-defined topic is search for one or more entities matching one or more of word-category associations of the word cluster.

9 Claims, 8 Drawing Sheets

METHOD AND SYSTEM OF IDENTIFYING AN ENTITY FROM A DIGITAL IMAGE OF A PHYSICAL TEXT

CROSS-REFERENCE TO RELATED APPLICATIONS

This application is a claims priority from U.S. patent application Ser. No. 14/517,920, titled METHOD AND SYSTEM OF IDENTIFYING AN ENTITY FROM A DIGITAL IMAGE OF A PHYSICAL TEXT and filed on 20 Oct. 2014. U.S. patent application Ser. No. 14/517,920 claims priority from U.S. Provisional Application No. 61/92,174, titled A METHOD AND SYSTEM OF IDENTIFYING AN ENTITY FROM A DIGITAL IMAGE OF A PHYSICAL TEXT and filed 2 Jan. 2014. This application is hereby incorporated by reference in its entirety.

FIELD OF THE INVENTION

The invention is in the field of computer vision and more specifically to a method, system and apparatus of identifying an entity from a digital image of a physical text.

DESCRIPTION OF THE RELATED ART

Mobile devices enable users to capture digital photographs. Optical character recognition (OCR) software can extract text from a digital photograph that includes text, such as a photograph taken of a sign or document. Previous uses of mobile OCR technology have included translation of text into a different language, identifying numbers associated with bank accounts and/or dollar amounts from a digital image of a check for processing.

Mobile devices can also possess broadband internet capability. Users can use mobile devices to query web sites and/or applications for information whenever connectivity is available. Accordingly, there has been a proliferation of applications allowing users to search for relevant information to their current context. For example, a user of a restaurant-reviews application can enter the name of a restaurant into a form and receive reviews of that restaurant. Similarly, users of a wine reviews application can query the name of a wine item and receive information, such as, ratings, information about the grape, region, producer, etc. Other applications enable a user to take a digital image of a product's bar code to retrieve information about the product (e.g. price).

While such applications enable users to query information about a single product at one time, having information about multiple products at once can be important when a user is making a choice between products printed or written on a list (e.g. a menu). Lists of multiple products may include the name of each product, a limited amount of information to uniquely identify a product and/or transactional information such as a product's price. However, lists of multiple products may not contain additional information to help users make a choice between multiple products. Having additional information would be useful to a consumer. For example, knowing the average retail price of the product, an indication of the product's quality, and reading reviews of several products at once may help a user make an informed choice. Even though this information may be useful, a business and/or individual selling items may not list this information, either because there is no space to write it on a list, the seller are unaware of the information and/or the seller purposefully withholds the information. For example, a seller may know the going price for a product, but, choosing to mark up a product heavily, may not list the market price.

Even when relevant information may be available elsewhere to a user, existing applications and/or technologies are poor at quickly giving users such information about multiple products. For instance, a user choosing a wine item from multiple choices on a wine list may have to type in the name of every wine to search a reviews site or application. Typing out each product name on a small mobile keyboard, whether physical or virtual, may be cumbersome and time consuming. An application that enables the user to obtain information about a product using a photo of that physical product would not be helpful in the scenario of being presented a list of products, since the user is unlikely to be presented with the physical embodiment each product before making a selection. For example, a user at a restaurant selecting from a wine menu may not be able to take a photo of each wine bottle as the wines are generally stored out of sight until brought to the table.

In view of this, improvements may be made over conventional methods if, for example, a user were able to identify entities from a digital image of a physical text obtained with the user's mobile device camera (or other sources such as a web page).

BRIEF SUMMARY OF THE INVENTION

In one aspect, a server-side method of identifying a wine entity from text in a digital image of a wine menu includes obtaining a digital image from a mobile device. The digital image includes a digital photograph of a physical text. At least a portion of the physical text is related to a pre-defined topic. The digital image includes a digital photograph of a wine menu, and wherein the pre-defined topic comprises a wine-related topic. The digital photograph of the physical text is converted to a text in a computer-readable format. A word dictionary is provided. The word dictionary includes a set of words related to the pre-defined topic. A set of words of the text is matched to similar words in the set of words in the word dictionary. A step includes identifying a word cluster in the text, wherein each word in the word cluster is associated with a category of a single entity. The single entity is a member of a class of entities demarcated by the pre-defined topic. The class of entities demarcated by the pre-defined topic comprises a set of wine items. A set of categories of the wine item comprises a wine varietal, a wine producer and a wine vintage. A step includes searching a database comprising a list of members of the class of entities demarcated by the pre-defined topic for one or more entities matching one or more of word-category associations of the word cluster. A user instruction that identifies the word cluster is received.

BRIEF DESCRIPTION OF THE DRAWINGS

The present application can be best understood by reference to the following description taken in conjunction with the accompanying figures, in which like parts may be referred to by like numerals.

The Figures described above are a representative set, and are not an exhaustive with respect to embodying the invention.

Description

Disclosed are a system, method, and article of manufacture of identifying an entity from a digital image of physical text, according to some embodiments. The following description is presented to enable a person of ordinary skill in the art to make and use the various embodiments. Descriptions of specific devices, techniques, and applications are provided only as examples. Various modifications to the examples described herein may be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Clusters (e.g. a word cluster) can be a set of regions in a digital image recognized as containing individual words, and, taken together, likely to represent a single particular entity/item.

Computer vision can include methods for acquiring, processing, analyzing, and understanding images.

Dictionary word can be a word included in a set of a priori known words of interest and/or related to a type of entity (e.g. wine item entities).

Digital image can be a numeric representation (e.g. binary representation) of a two-dimensional image. In some examples, the digital image can be of a vector or raster type.

Machine learning systems can include systems that can learn from data, rather than follow explicitly programmed instructions. Machine learning systems can implement various machine learning algorithms, such as, inter alia: supervised learning, unsupervised learning (e.g. artificial neural networks, hierarchal clustering, cluster analysis, association rule learning, etc.), semi-supervised learning, transductive inference, reinforcement learning, deep learning, etc.

Mobile device can include smart phones, cell phones, personal digital assistants, tablet computers, wearable computers, smart watches, smart glasses (e.g. Google Glass®), etc.

N-gram can be a contiguous sequence of 'n' characters/items from a given sequence of text.

Optical character recognition (OCR) can be the electronic conversion of scanned or photographed images of typewritten or printed text into machine-encoded/computer-readable text.

Exemplary Methods

In one example embodiments, a mobile-device application can enable a user to obtain a digital image of a physical list(s) (e.g. utilizing a digital camera system). The digital image of the list can be parsed with an OCR functionality and/or other technology. Detailed information on some or all of the canonical items contained in said list can be received. After the digital image is processed, the text is matched to a database of items, and a user may be able to select any item successfully recognized. Detailed information on the item can be obtained from a database and communicated to the user (e.g. via the mobile-device application). Accordingly, through use of the mobile-device application, the user can compare many items on any photographed list using metadata about each recognized item through local and/or remote processing and/or database retrieval.

Figure 1:
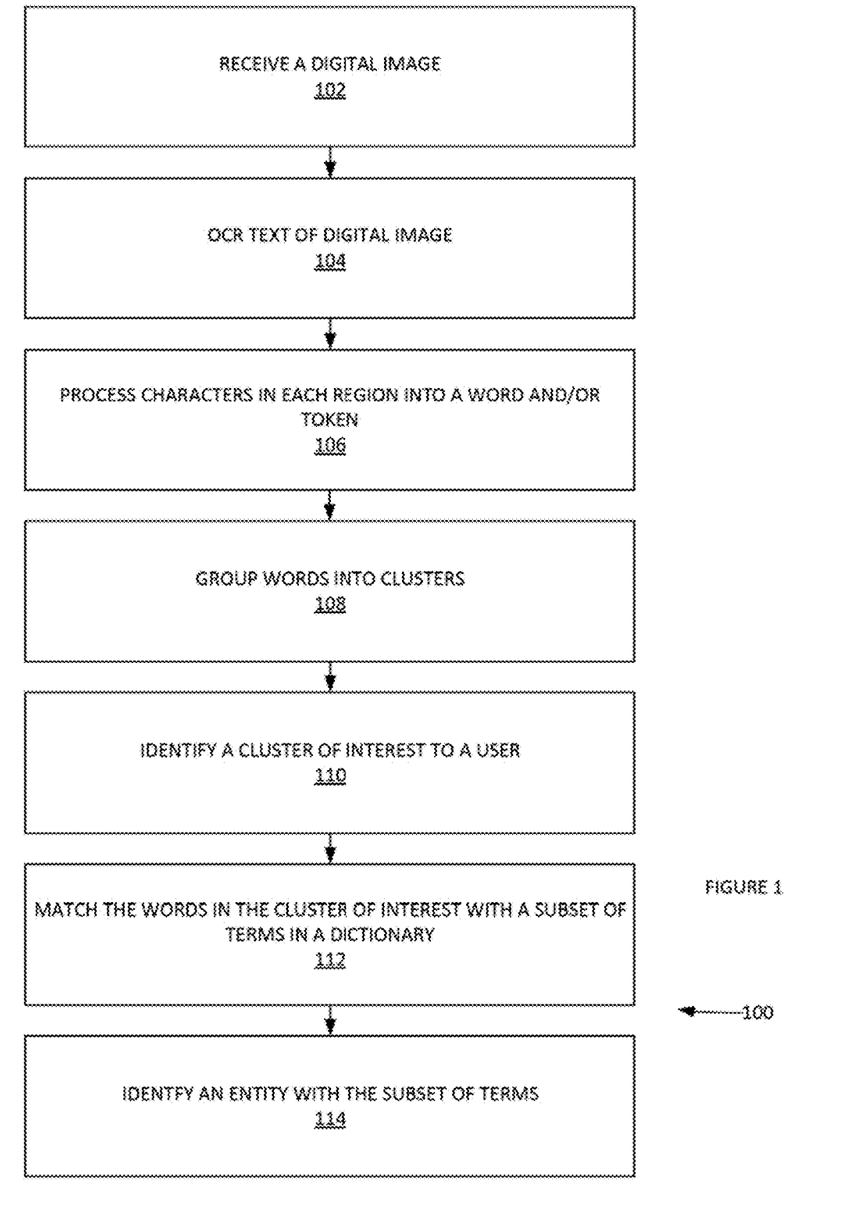
FIG. 1 depicts, in block diagram format, an example process of identifying an entity from text in a digital image, according to some embodiments.

FIG. 1 depicts, in block diagram format, an example process 100 of identifying an entity from text in a digital image, according to some embodiments. In step 102 of process 100, a digital image can be received from a mobile device. The digital image can include a list of entities (e.g. wine items). For example, a user can utilize a digital camera system of a mobile device to take a digital image of a wine menu. The digital image can then be provided to a system that implements process 100. The digital image can undergo various pre-processing and/or cleaning processes (e.g. de-skewing, binarization, de-speckling, line removal, segmentation, zoning, etc.). In step 104, the text in the digital image can be converted into computer-readable characters (e.g. utilizing an OCR process). In step 106, the characters in each region of text (e.g. a box-like pixel region of text in a line that includes a dictionary word) can be processed into words (e.g. dictionary words, tokens and/or other atomic parse elements). Dictionary words can be words that are included in a dictionary of words/tokens used to describe categories/attributes of an entity.

In step 108, words can be grouped into one or more clusters. In one example, a cluster can be a set of (recognized and/or partially recognized) words in a series (and/or other specified pattern). Clusters can be defined based on a set of rules. The set of rules can be provided based on entity type. The set of rules can be based on various factors such as cultural practices, professional practices and/or other normative practices associated with textual descriptions of an entity to be identified from the set of words in the cluster (e.g. marketing differentiation of wines by grape variety or geographical appellations for wines from certain origin jurisdictions, etc.). The set of rules can be based on prior knowledge of how entities are normally represented/layout of the entity type on the physically printed text (e.g. prior knowledge of how wines are represented in a printed wine menu).

In one example, the entity can be a particular bottle of wine and the cluster of words can be a description of said bottle of wine in a digital image of a wine menu. The definition of a cluster of words can be based on various accepted norms and/or rules used in the restaurant and/or wine industries to create wine menus and/or describe bottles of wine. For example, each bottle of wine can be associated with only a single vintage (e.g. grapes that were all, or primarily, grown and harvested in a single specified year). Accordingly, only one set of numerals may be associated with a vintage year within the cluster. In another example, a set of words identifying a wine item can be known to be represented in a single series of tokens that represent specified categories/attributes (e.g. words for specific vintages, varietals, producers, etc.). A cluster can then be defined to include a grouping of words of these specified categories/attributes. The boundaries of the cluster can be defined to begin and/or end upon such factors as, inter alia: detection of a repetition of an attribute, end of a line of text, detection of non-specified attributes (e.g. non-dictionary words that do not fit into a wine category), etc. The rules are provided by way of example and not of limitation. Other pre-defined and/or ad hoc rules (e.g. as determined by machine learning algorithms implemented by the identification application and/or a supporting remote server) can be implemented to identify clusters of identifying words/tokens in other example embodiments.

In some examples, various machine learning techniques can be used to learn various menu-specific rules such as header contents and/or location, identify cluster boundaries, identifying regions of text, etc. Accordingly, rules for implementing process 100 can be both explicitly defined by an administrator and/or algorithmically learned without being explicitly programmed. Example machine learning approaches can be implemented, including, inter alia: decision tree learning, association rule learning, artificial neural networks, inductive logic programming, support vector machines, clustering, Bayesian networks, reinforcement learning, representation learning, similarity and metric learning, sparse dictionary learning, etc.

In step 110, a cluster of interest to a user can be identified. For example, a user can use a computer input system (e.g. a touch screen, mouse, voice, etc.) to manually indicate a cluster of interest (e.g. a line of text in a wine menu, etc.). In step 112, the words in the cluster of interest can then be matched with a subset of terms in a digital dictionary (e.g. utilizing a look up algorithm). The subset of terms can be ordered according to a strength of matching between the each term in the dictionary and various identified dictionary words. In one example, all clusters can be set as a cluster of interest. In step 114, the subset of terms can be used to identify an entity. For example, each term can be matched to a category/attribute of the entity and a database of entities queried accordingly. Information obtained from process 100 can be provided to a user via a mobile device application UI. The user can interact with the presentation (e.g. via hyperlinks to additional information about an entity association with an indicated cluster).

Figure 2:
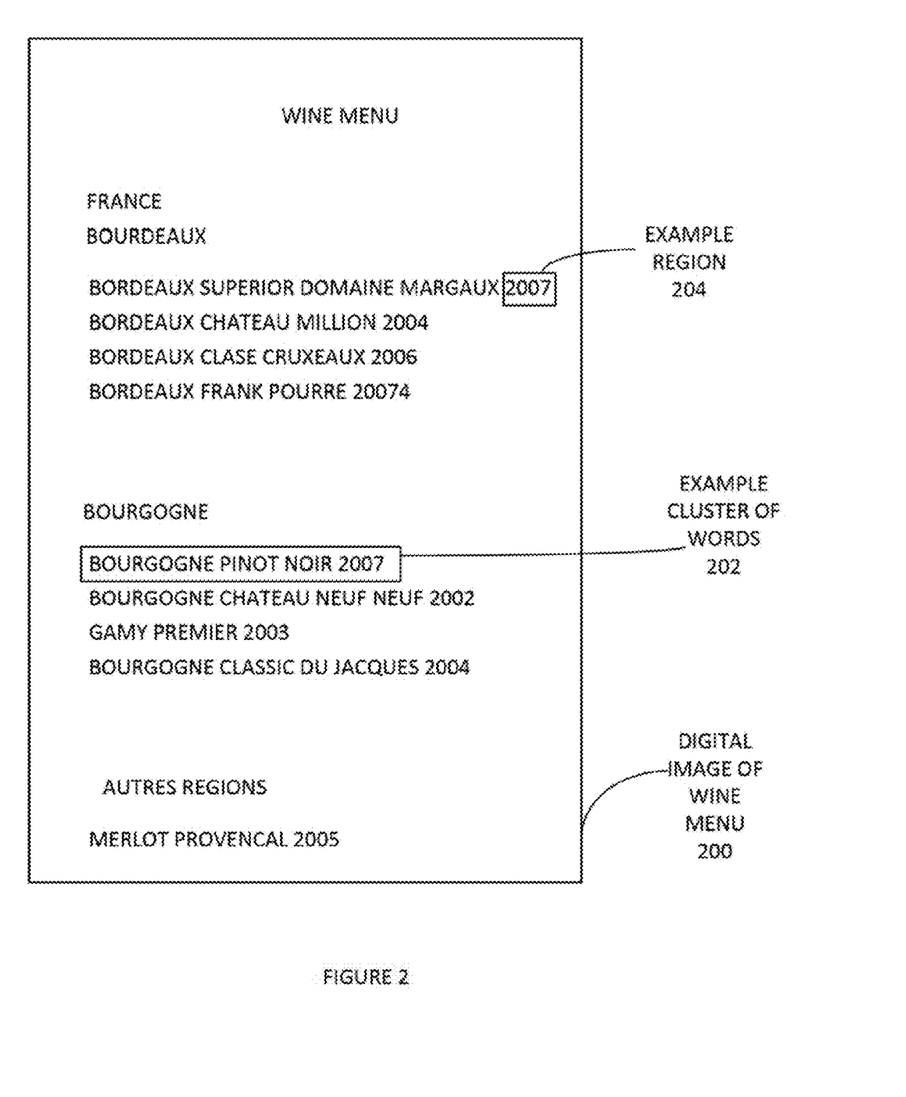
FIG. 2 illustrates an example digital image of a wine menu, according to some embodiments.

FIG. 2 illustrates an example digital image of a wine menu 200, according to some embodiments. In one example of process 100, a mobile-device application can process one or more digital images of wine menus 200 taken by a camera system of a mobile device. An OCR engine can scan digital image 200 and return machine-encoded/computer-readable text. The text can be organized into set of regions of the digital image. The characters in each region can be associated with distinct dictionary words and/or other words, tokens, etc. The dictionary words can a pre-generated set of words used to describe attributes of wine items (e.g. wines and/or wine bottles). In the present example, as the entities of interest are wine items, the dictionary may be composed of dictionary words such as, inter alia: chateau, chardonnay, Rhone, and/or other words referring to individual grapes or contained in the names of vintners and the like. Each dictionary word can be associated with a particular category such as, inter alia: vintage, varietal, producer, origin, price, etc. For example, example region 204 illustrates an example vintage year "2007" parsed into a single region. This vintage year can be associated with wine category/attribute 'vintage'.

The regions can then be grouped together to form clusters. Each cluster can be a set of words (as used herein, 'word' can include other tokens (e.g. numeric years such as '1966', etc.)) found in a wine words dictionary database and associated with the attributes (e.g. wine categories) of a bottle of wine. Various category rules can be implemented regarding how the specific words/tokens of the various regions can be organized into a cluster. For example, each cluster can include a set of dictionary words/token belonging the wine categories of a particular wine item. A wine category can include the name of a region, wine classification, vintner or winery, vintage or year of production, etc. Category rules can include the necessity of one category (e.g. a vintner) and the necessity of having no more than one word or phrase of a certain category (e.g. only one vintage can be included).

FIG. 2 illustrates an example cluster of words. Each word in the cluster has been obtained from a separate region of recognized text. Each word is associated with a particular wine category of a bottle of wine. Wine categories can be matched with the various words of the cluster. In this particular example, it can be determined that each cluster is on a separate line and that header labels can be included in subsequent clusters as a word for a particular wine category. In the present example, a 'nation of origin' wine category can be 'France' for the subsequent clusters. A 'wine region of origin' wine category can be Bordeaux for the set of clusters following the 'Bordeaux' header and until the next identifiable 'wine region of origin' wine-category header appears (e.g. 'Bourgogne', etc.). Accordingly, an example cluster 202 can include a set of recognized wine attributes such as: appellation (e.g. 'Bordeaux'), varietal (e.g. 'Merlot'), wine classification ('grand cru'), vintner ('Christian Moueix') and/or vintage ('2009'). In one example, words/tokens not included in a wine-words dictionary can be ignored as these elements may not include information regarding the identity of the wine items. These words can then be used to locate '2009 Christian Moueix Merlot' in a database of wine items in the effect a user selects this particular cluster per step 110 of process 100.

Another recognized cluster in FIG. 2 consists of dictionary-matched words: a region ("Pauillac"), wine classification ("grand cru"), vintner ("classe Chateau Clerc Milon"), and vintage ("2004"). It is noted that clusters can be visually indicated with the user interface, for instance, by color shading the region in the image corresponding to each cluster.

It is noted that successfully recognized and parsed word clusters can then be matched to a local dictionary of items utilizing various information retrieval methods (e.g. set-theoretic models, probabilistic models, algebraic models, models with transcendent term interdependencies, similarity metrics, etc.). For example, various similarity metrics between the text in a user-selected cluster and the text of the item's categories can be implemented. Similarity metrics can include, inter alia, the number of words in the cluster that match the text of one of the item's categories, the percentage of words in one of the item's categories contained in the text of the cluster, and the number of sequences of 'n' or more contiguous characters (n-grams) in the words of the item's categories that is contained in the recognized text of the regions within each cluster. In the event, a word cluster is successfully matched to one or more canonical items, each canonical item can have an associated uniquely identifying key. A database on a remote server can be queried for metadata about each canonical item using the key. This metadata can include such information as, inter alia: a score for the wine, an average retail price, and/or user-generated content containing descriptions of the taste and smell of the wine. This metadata can be contained in a database on a remote server (e.g. implemented in a cloud-computing environment) and may be updated at any time without the need to upgrade each client application. For example, when the retail price for a canonical item changes or a new review of an item is available, each client application may subsequently retrieve a most recent price and/or set of reviews.

Metadata for all the items identified in an image can be queried at a single time or on a periodic basis. Metadata about each canonical item can be retrieved for all recognized items. The metadata retrieved from a remote canonical item database can then be displayed on the user interface of the mobile device at when the user selects the image region containing the item's matching word cluster. Hence, while keeping in mind potential differences in processing speed due to the computing power and internet connectivity speed of different mobile devices used, the application in this embodiment may provide users quick and easy access to ratings, pricing data, and qualitative data for a number of wines on a single wine menu. It is also noted that the user interface can also include overlaying 'tapable' areas on the wine list, displaying data in an 'info card' on the mobile device screen, etc.

Figure 3:
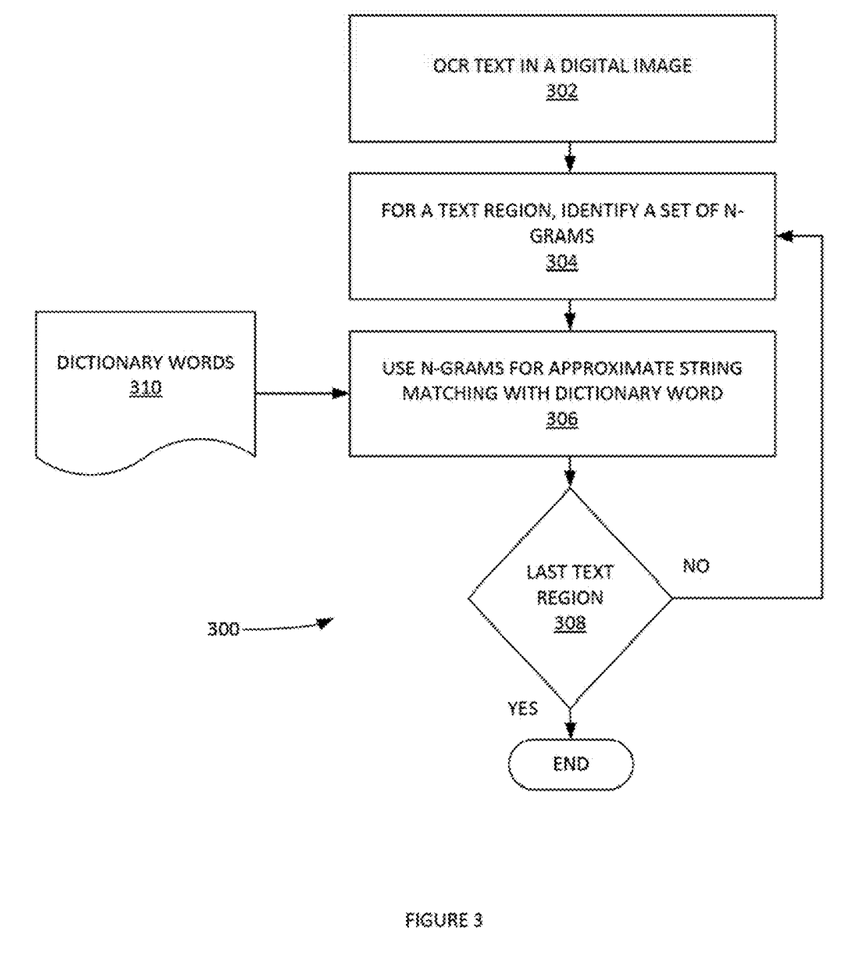
FIG. 3 illustrates an example process that matches character strings to words, according to some embodiments.

FIG. 3 illustrates an example process 300 that matches character strings to words, according to some embodiments. Process 300 can be used for linear n-gram scanning processes to convert character strings to words according to a statistical algorithm that matches character strings. In one example, n-gram scanning can work by moving a sliding window a width 'n' a text and recording the number of occurrences of characters in the window. Accordingly, the text can be represented as a vector. The vector can include distinct constituent n-grams as well as their respective relative frequencies. In step 302 of process 300, a digital image of text can be recognized/identified with an OCR process. In step 304, each of the n-grams a region of text can be identified. In step 306, the characters in the region of text can be matched to a dictionary word (e.g. from dictionary words 310 or lists of entities to be identified) using the n-grams (e.g. with an n-grams for approximate matching algorithm and/or approximate string matching algorithms). In step 308, it can be determined if the region of text is the last region of text in the text document. If no, process 300 can return to step 304. If yes, process 300 can end.

Figure 4:
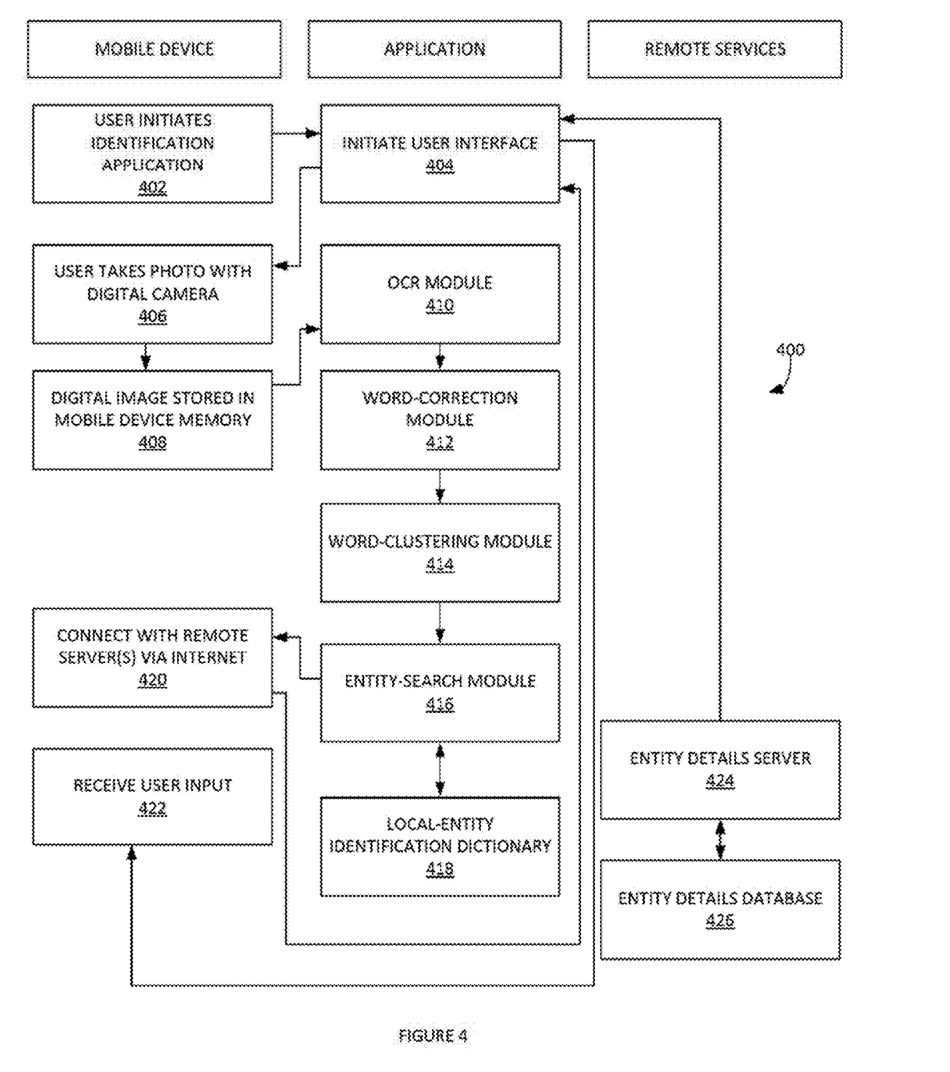
FIG. 4 illustrates another example method of identifying an entity from text in a digital image, according to some embodiments.

FIG. 4 illustrates another example method 400 of identifying an entity from text in a digital image, according to some embodiments. Method 400 can be implemented, in part, with an identification application operating in a mobile device. User can open the identification application in the mobile device 402. The identification application can implement a user interface 404. The user takes a digital image of a printed list using the mobile device camera in step 406. The digital image can then be stored locally in the mobile-device memory storage 408. In another example (not shown) the user may use the identification application to retrieve an existing image from local memory or other data storage (e.g. remote database).

Once a digital image is obtained and/or retrieved, it is then processed by an OCR module 410. OCR module 410 can scan said image for characters, which may be numbers, letters, punctuation, accented letters, and other kinds of characters, and conceives "image regions" where characters are grouped closely together. OCR module 410 can then processes said image regions and return a digital character string for each region.

Word-correction module 412 receives recognized text from OCR module 410. Word-correction module 412 can convert character strings in the image regions to individual words. In an example embodiment, word-correction module 412 can utilize a linear n-gram scanning process. Linear n-gram scanning process can convert character strings to words according to a statistical algorithm that matches character strings (e.g. trigrams of character strings in a word to a local dictionary of allowable words). One statistical algorithm can include determining a percentage of n-grams in a region's post-processed character string that matches the n-grams of a word in the local dictionary.

Having converted the character strings to individual words, word-clustering module 414 then processes the image regions (e.g. that include the words of process 100) and combines the individual words listed therein to clusters (e.g. word clusters). In one example, before the conversion of character strings to dictionary-matched words, word-clustering module 414 can match words together based on geographical groupings and statistical rules, to form a cluster. In one example embodiment, this serves to extract a relevant 'item' (e.g. an entity) from the words contained in a given image region. For example, the names of specific wines on a wine menu consisting of several words which may appear in different orders (or perhaps not at all). In an example embodiment, an image region may first list the year of a wine, then the producer, then the region, whereas other menus may contain the same wine but in a different format/order, such as, with the producer first, followed by the region and finally the year of production. For example, the first cluster of FIG. 2 demarks a recognized cluster that includes dictionary-matched words: a region ("Pauillac"), wine classification ("grand cru"), vintner ("classe Chateau Clerc Milon"), and vintage ("2004"). In one example, word-clustering module 414 can sort the words into canonical items through an algorithm that refers to the module's local-entity dictionary and cluster said words contained in the image regions according to the local-entity dictionary. The clusters can then be visually indicated in the user interface module. For example, clusters can be visually by color shading the text region in the image corresponding to each cluster (e.g. see FIG. 2 supra).

Figure 7:
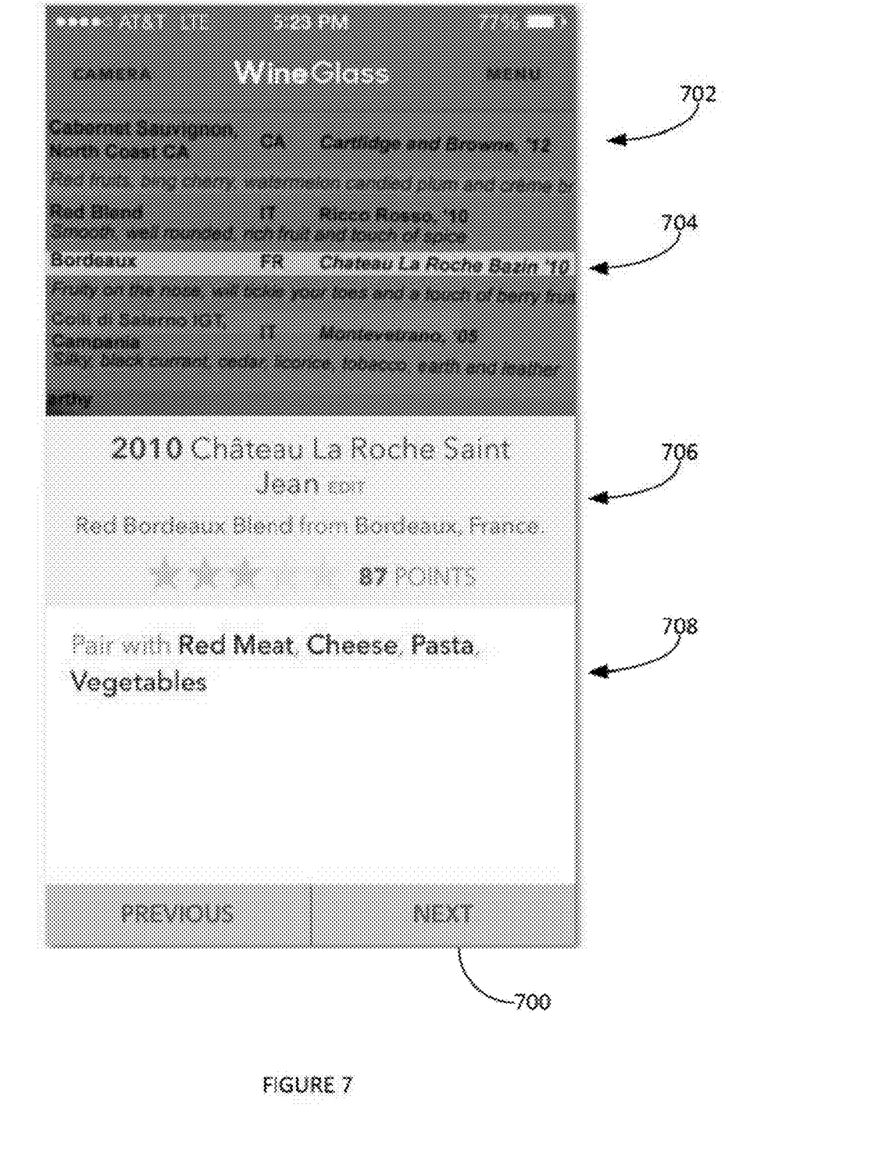
FIG. 7 depicts an example screen shot of a mobile device application display, according to some embodiments.

In an example embodiment, the identification application has thus far converted regions of an image to individual word clusters representing specific items. Entity-search module 416 receives the word clusters and submits them to a local-item identification database 418. Entity-search module 416 can match word clusters with entities included in the database by several methodologies such as: search engines, similarity metrics, etc. An example similarity metric can include the number and accuracy of n-grams in a word cluster that are statistically similar to the n-grams contained in a local dictionary entity. Another similarity metric can be the number of words in a cluster that match words in a dictionary item category. Since a word may be repeated or absent in a cluster but present or missing in the dictionary item category, the Entity-search module 416 can match a similarity across different categories between clusters and/or dictionary items. Following the matching process, the local-item identification database 418 can return a set of possible item matches for each cluster. A single cluster may match numerous entities. For instance, if a list contains wine items, and the cluster contains the varietal text and vintner text but no vintage year, then the wine items corresponding to the varietal and vintner, each with a different vintage year, may comprise the set of possible matches. Accordingly, the various possible matches can be updated in the user interface for the user to select from. Additional information about the item matches can be displayed as well. FIG. 7, infra, provides additional examples with respect to a wine menu use case.

For each set of entities identified as matches for each cluster, the identification application can then query remote entity-details server 424 (e.g. using the mobile device's internet connection 420). Entity-details server 424 can, in turn, query entity-details database 426 for information (e.g. various metadata, additional details, etc.) about the entity corresponding to the identified wine items (e.g. with an identification key). In an example embodiment, these details may be an individual wine's rating, score, reviews from various sources, tasting notes, and other quantitative or qualitative data about the wine item. In some other embodiments the item in question may be a particular beer, in which case the item details might include brewery details, similarly tasting beers, aggregate ratings, and tasting notes. Other embodiments may query a database for details on a food item, in which case the item details might include reviews, notes on seasonality of the food, details on producers of ingredients of the dish, and others.

Entity-details database 426, having retrieved additional data for each entity corresponding to the identification keys (e.g. words in the cluster, etc.), can return metadata about each entity to entity-details server 424. Entity-details server 424 can then serializes each entity's metadata to the identification application and encapsulates it in a Hypertext Transfer Protocol (HTTP) response over an internet connection. The serialization format could be Extensible Markup Language (XML), JavaScript Object Notation (JSON), or other format. It is noted that the metadata can be locally stored in the mobile device's memory. This information can be present on the mobile device's UI to the user.

It is noted that, in some embodiments, various steps provide in process 400 at the mobile device and/or application layer can be offloaded to remote server(s) in whole or in part. For example, the image can be sent to a backend server for OCR processing and matching, i.e. the entire process takes place remotely. Additionally, in some examples, a digital image can be obtained from a web page file. For example, a Portable Document Format (PDF) version of a wine menu can be downloaded from a web server that hosts a restaurant's website.

Following display of the entity's information and/or metadata, the user can select another cluster (e.g. by tapping on the image region of a touchscreen display associated with the cluster). The identification application can then retrieve and display information and/or metadata for the individual item (e.g. wine item) matches corresponding to that image region. A user may elect to browse each possible match of a cluster. For example, the user can tap an arrow or swiping on the touch screen of mobile device 100. In some embodiments, the identification application can automatically process the digital image provided, including word correction, word clustering, item identification matching, and item detail retrieval 'in the background' without user selection of individual image regions. In this way the user can experience minimal wait time when he/she selects an image region to receive details on the item contained therein. In one example, the user can press a virtual button on the identification application to capture a different image at any time, at which point the application workflow can begin anew. It is noted that in some embodiments, image processes steps and/or functionalities can be located on a remote server and not in the local mobile device's application (e.g. see FIG. 8 infra).

Exemplary Systems

Figure 5:
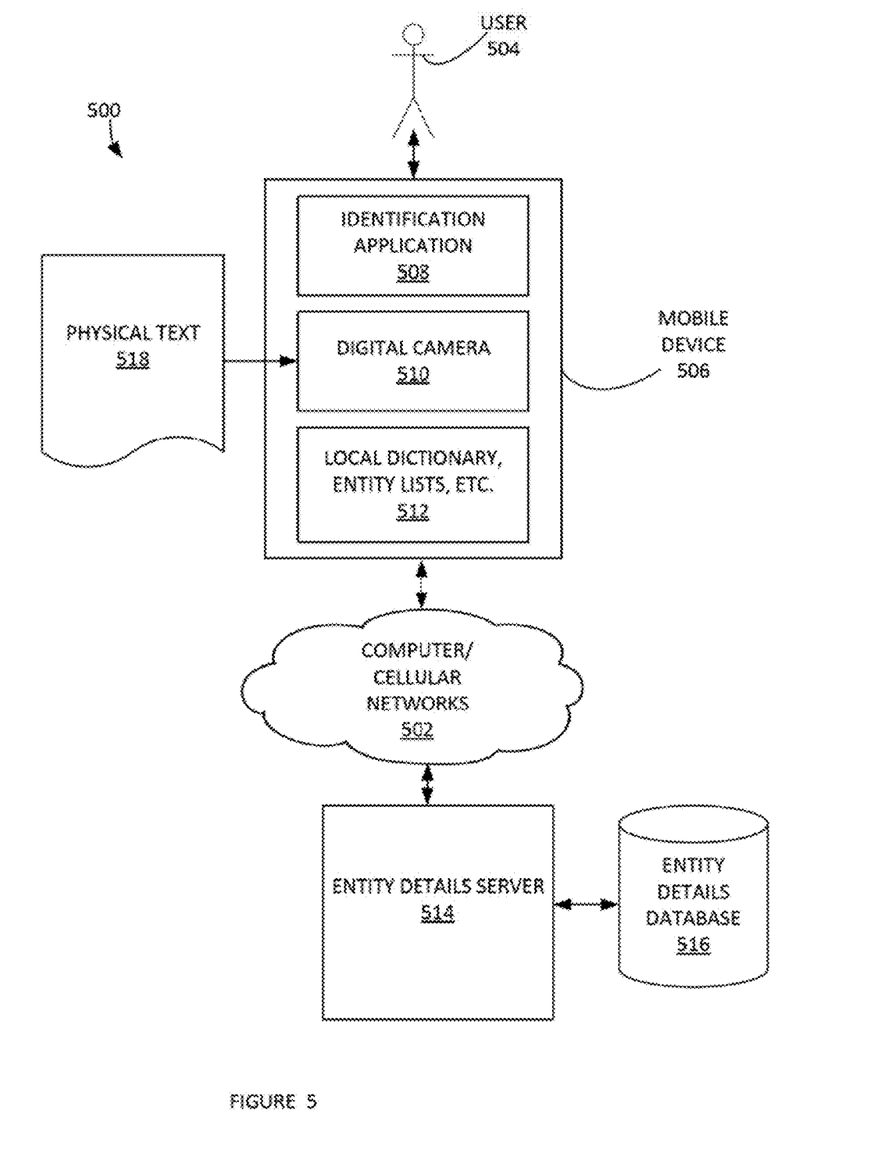
FIG. 5 depicts, in block diagram format, an example system for implementing various processes for identifying an entity from a digital image of a physical text, according to some embodiments.

FIG. 5 depicts, in block diagram format, an example system 500 for implementing various processes for identifying an entity from text in a digital image, according to some embodiments. User 504 can utilize a digital camera 510 in mobile device 506 to obtain a digital image (e.g. as provided in underlying digital image of FIG. 2) of physical text 518. User 504 can utilize an identification application 508 in mobile device 506 to obtain an identity of an entity described by terms in physical text 518. For example, identification application 508 can implement processes 100, 300 and/or 400. Mobile device 506 can include a local dictionary, list of entities (e.g. a list of wine items), remote server identifiers and network address(es), data bases of recently identified entities (e.g. include metadata, purchase information, etc.), and the like. Mobile device 506 can communicate with various remote server(s) such as entity details server 514, entity details database 516, search engine servers, third-party databases, retail websites, etc. via computer/cellular networks 502 (e.g. the Internet, cellular data networks, etc.). Entity details server 514 can include functionalities for identify entities describes by words in a cluster and/or obtain additional information about said identified entities. Various information about the identifiable entities and/or additional metadata can be included in entity details database 516.

Figure 6:
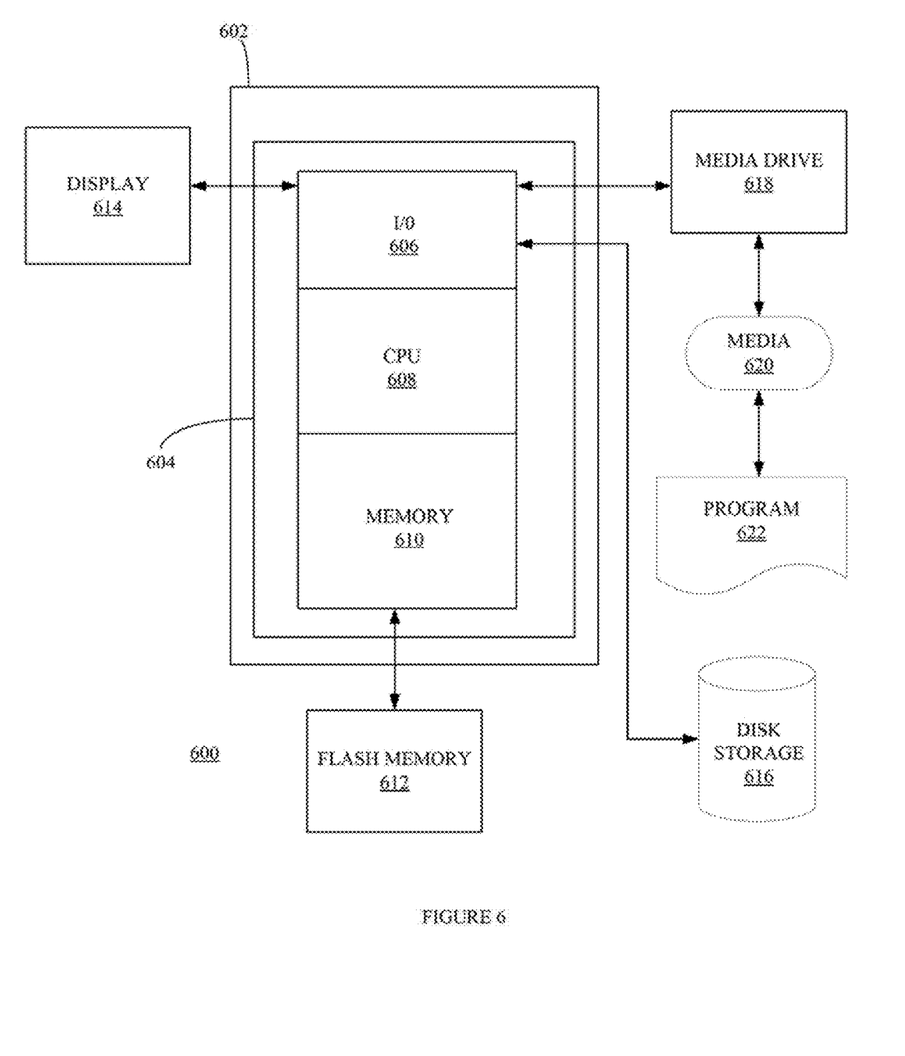
FIG. 6 depicts an exemplary computing system that can be configured to perform any one of the processes provided herein.

FIG. 6 depicts an exemplary computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities. In some embodiments, system 600 can be included and/or be utilized by the various systems and/or methods described herein.

FIG. 7 depicts an example screen shot 700 of a mobile device application display, according to some embodiments. Screen shot 700 can include a region 702 displaying a digital image of a wine menu. Region 702 can include a display of a visual indicator of a set of words 704 selected by a user. Identification application 508 can utilize the set of words 704 to identify one or more wine products described by the set of words 704. The identification information can be provided in region 706. In some examples, region 706 can also include, inter alia, hyperlinks to third-party websites where the user can purchase the identified wine product. Other information about the wine product can be provided in region 706 (e.g. ratings, general information about varietal, producer, etc.). Other information about the wine product can be provided in region 708 (e.g. food pairings, etc.).

Figure 8:
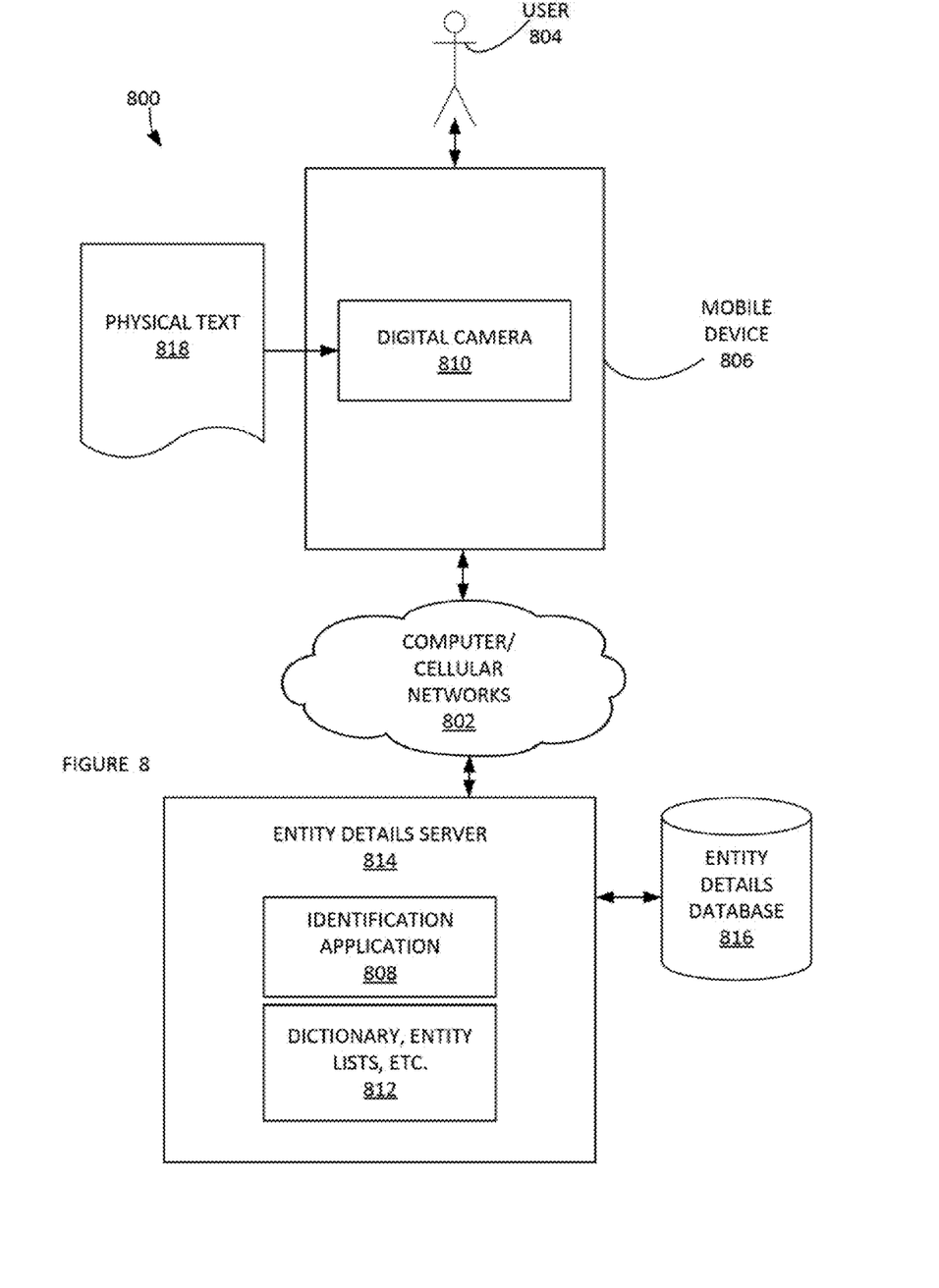
FIG. 8 depicts, in block diagram format, an example system for implementing various processes for identifying a wine entity from a wine-menu text in a digital image of said wine-menu text, according to some embodiments.

FIG. 8 depicts, in block diagram format, an example system 800 for implementing various processes for identifying a wine entity from a wine-menu text in a digital image of said wine-menu text, according to some embodiments. User 804 can utilize a digital camera 810 in mobile device 806 to obtain a digital image of the physical text 818 of the wine menu. The digital image can be communicated to entity-details server 814 for image process and/or other steps. User 804 can utilize an identification application 808 to obtain an identity of a wine entity described by terms in physical text 818. For example, identification application 808 can implement processes 100, 300 and/or 400 (e.g. from a server-side implementation). Entity details server 814 can include a local dictionary, list of wine entities (e.g. a list of wine items), remote server identifiers and network address(es), data bases of recently identified wine entities (e.g. include metadata, purchase information, etc.), and the like. Entity details server 814 can include functionalities for image processing, identify entities describes by words in a cluster and/or obtain additional information about said identified entities. Various information about the identifiable wine entities and/or additional metadata can be included in entity details database 816. It is noted that in other example embodiments, the various functionalities of entity details server 814 can be shared with an application in the mobile device 806 in whole or in part.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) and/or some specialized application-specific language (PHP, Java Script, XML).

B. CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A server-side method of identifying a wine entity from text in a digital image of a wine menu comprising:
   obtaining a digital image from a mobile device, wherein the digital image comprises a digital photograph of a physical text, wherein at least a portion of the physical text is related to a pre-defined topic, wherein the digital image comprises a digital photograph of a wine menu, wherein the pre-defined topic comprises a wine-related topic, and wherein the digital photograph is obtained with a digital camera system in the mobile device of a user;
   converting the digital photograph of the physical text to a text in a computer-readable format;
   providing a word dictionary, wherein the word dictionary comprises a set of words related to the pre-defined topic;
   matching a set of words of the text to similar words in the set of words in the word dictionary;
   identifying a word cluster in the text, wherein each word in the word cluster is associated with a category of a single entity, wherein the single entity is a member of a class of entities demarcated by the pre-defined topic, wherein the class of entities demarcated by the pre-defined topic comprises a set of wine items, and wherein a set of categories of the wine item comprises a wine varietal, a wine producer and a wine vintage;
   searching a database comprising a list of members of the class of entities demarcated by the pre-defined topic for one or more entities matching one or more of word-category associations of the word cluster;
   receiving a user instruction that identifies the word cluster; and
   implementing a linear n-gram scanning processes to convert a set of character strings of each word in the set of words of the text to words related to the pre-defined topic according to a statistical algorithm.

2. The method of claim 1, wherein the word cluster is identified based on a set of pre-defined rules for determining that each word in the word cluster is related to a category.

3. The method of claim 2, wherein the set of pre-defined rules comprises a vintage rule that allows for only a single vintage-related word to define a vintage category of the set of wine items.

4. The method of claim 3, wherein the set of pre-defined rules are based on a prior knowledge of a normative layout of an entity type on a physically-printed text.

5. The method of claim 1 further comprising:
   returning a sorted list of the one Or more entities matching the one or more of word-category associations of the word cluster, Wherein in the list is ranked based on the number of matches between the word-category associations of the word cluster for each entity in the list.

6. A computerized system of identifying a wine entity from text in a digital image of a wine menu comprising:
   a processor configured to execute instructions;
   a memory including instructions when executed on the processor, causes the processor to perform operations that:
      obtains a digital image from a mobile device, wherein the digital image comprises a digital photograph of a physical text, wherein at least a portion of the physical text is related to a pre-defined topic, wherein the digital image comprises a digital photograph of the wine menu, and Wherein the pre-defined topic comprises a wine-related topic;
      converts the digital photograph of the physical text to a text in a computer-readable format;
      provides a word dictionary, wherein the word dictionary comprises a set of words related to the pre-defined topic;
      matches a set of words of the text to similar words in the set of words in the word dictionary;
      identifies a word cluster in the text, wherein each word in the word cluster is associated with a category of a single entity, wherein the single entity is a member of a class of entities demarcated by the pre-defined topic, wherein the class of entities demarcated by the pre-defined topic comprises a set of wine items, and wherein a set of categories of the wine item comprises a wine varietal, a wine producer and a wine vintage;
      searches a database comprising; a list of members of the class of entities demarcated by the pre-defined topic for one or more entities matching one or more of word-category associations of the word cluster;
      receives a user instruction that identifies the word cluster;
      returns a sorted list of the one or more entities matching the one or more of word-category associations of the word cluster, wherein in the list is ranked based on the number of matches between the word-category associations of the word cluster for each entity in the list; and
      implement a linear n-gram scanning processes to convert a set of character strings of each word in the set of words of the text to words related to the pre-defined topic according to a statistical algorithm.

7. The computerized system of claim 6, wherein the digital image is obtained with a digital camera system in the mobile device of a user.

8. The computerized system of claim 7, wherein the word cluster is identified based on a set of pre-defined rules for determining that each word in the word cluster is related to a wine category.

9. The computerized system of claim 8, wherein the set of rules are based on a prior knowledge of a normative layout of an entity type on a physically-printed wine-menu text.

* * * * *